United States Patent
Zhang et al.

(10) Patent No.: US 8,151,216 B2
(45) Date of Patent: Apr. 3, 2012

(54) ELECTRONIC APPARATUS AND LIST DISPLAY METHOD OF ELECTRONIC APPARATUS

(75) Inventors: Yue Zhang, Tokyo (JP); Akemi Toyokura, Tokyo (JP); Takashi Ichinose, Tokyo (JP)

(73) Assignee: Fujitsu Toshiba Mobile Communications Limited, Kawasaki (JP)

(*) Notice: Subject to any disclaimer, the term of this patent is extended or adjusted under 35 U.S.C. 154(b) by 339 days.

(21) Appl. No.: 12/494,010

(22) Filed: Jun. 29, 2009

(65) Prior Publication Data

US 2010/0088645 A1 Apr. 8, 2010

(30) Foreign Application Priority Data

Oct. 8, 2008 (JP) ................................ P2008-261412

(51) Int. Cl.
*G06F 3/048* (2006.01)
(52) U.S. Cl. ................................ 715/838; 707/999.107
(58) Field of Classification Search .................. 715/838
See application file for complete search history.

(56) References Cited

U.S. PATENT DOCUMENTS

| | | | |
|---|---|---|---|
| 2005/0141856 A1* | 6/2005 | Furuta | 386/46 |
| 2006/0218195 A1* | 9/2006 | LaChapelle et al. | 707/104.1 |
| 2006/0288124 A1* | 12/2006 | Kraft et al. | 709/246 |
| 2007/0083827 A1* | 4/2007 | Scott et al. | 715/811 |
| 2007/0189735 A1* | 8/2007 | Kawashima et al. | 386/112 |

FOREIGN PATENT DOCUMENTS

JP 2008-65674 A 3/2008

* cited by examiner

*Primary Examiner* — Boris Pesin
*Assistant Examiner* — Angie Badawi
(74) *Attorney, Agent, or Firm* — Maschoff Gilmore & Israelsen (57) ABSTRACT

An electronic apparatus is provided in which, even in the case where a list of image files stored in a data folder is displayed to the user while another function is active, the list of image files can be displayed without degradation in the performance of the other function due to a CPU resource conflict. The electronic apparatus includes a storage unit configured to store a plurality of image files; an acquisition unit configured to acquire a CPU use rate when displaying a list of image files; a setting unit configured to set the display format of the list of image files on the basis of the CPU use rate; and a display unit configured to display the list of image files in the set display format.

14 Claims, 7 Drawing Sheets

| DISPLAY FORMAT | CPU USE RATE | CPU USE RATE AVAILABLE FOR NORMAL OPERATION OF CONTENDING FUNCTION |
|---|---|---|
| 5×5 THUMBNAIL DISPLAY | HIGH (90~100%) | SIGNIFICANTLY LOW (0~10%) |
| 3×3 THUMBNAIL DISPLAY | INTERMEDIATE (60~90%) | LOW (10~60%) |
| FILE-NAME LIST; FOCUSED THUMBNAIL DISPLAY | LOW (10~60%) | INTERMEDIATE (60~90%) |
| FILE-NAME LIST DISPLAY | SIGNIFICANTLY LOW (0~10%) | HIGH (90~100%) |

| DISPLAY FORMAT | CPU USE RATE | CPU USE RATE AVAILABLE FOR NORMAL OPERATION OF CONTENDING FUNCTION |
|---|---|---|
| 5 × 5 THUMBNAIL DISPLAY | HIGH (90~100%) | SIGNIFICANTLY LOW (0~10%) |
| 3 × 3 THUMBNAIL DISPLAY | INTERMEDIATE (60~90%) | LOW (10~60%) |
| FILE-NAME LIST; FOCUSED THUMBNAIL DISPLAY | LOW (10~60%) | INTERMEDIATE (60~90%) |
| FILE-NAME LIST DISPLAY | SIGNIFICANTLY LOW (0~10%) | HIGH (90~100%) |

| name | use count | last used |
|---|---|---|
| a001.jpg | 10 | 07/23 |
| a002.jpg | 5 | 06/01 |
| a003.jpg | 6 | 01/30 |
| a004.jpg | 15 | 05/22 |
| a005.jpg | 1 | 04/29 |
| a006.jpg | 22 | 07/10 |

FIG. 9

ELECTRONIC APPARATUS AND LIST DISPLAY METHOD OF ELECTRONIC APPARATUS

BACKGROUND OF THE INVENTION

1. Field of the Invention

The present invention relates to an electronic apparatus and a list display method of an electronic apparatus that set a display format for displaying a list of image files on the basis of a CPU use rate.

2. Description of the Related Art

In recent electronic apparatuses, such as mobile phones, many images, such as images photographed by cameras and images obtained over a network, have come to be exchanged among users. Thus, various interfaces for displaying a list of image files have been developed for these electronic apparatus. However, this has the problem of taking much time to display the list of images in the case where the number of image files stored in the memory of a mobile phone is large.

Thus, a mobile phone is proposed in which a user can smoothly create document data having a plurality of character codes and user image data such as when creating the body of e-mail (refer to Japanese Unexamined Patent Application Publication No. 2008-65674). This mobile phone reads thumbnail images corresponding to stored history information and displays a list of the thumbnail images in accordance with a user operation.

Electronic apparatuses, such as mobile phones, often provide functions by operating a plurality of modules at the same time. For example, there is a function of transmitting a still image that is stored in a mobile phone in advance, instead of a user's own live image, to a recipient while performing videophone communications by the mobile phone. To achieve this function with the mobile phone, it is necessary to activate a data folder module to display a list of files in a certain format to the user while executing a videophone module so that the user can select a desired file to be transmitted from the files.

However, mobile phones have limitation in CPU resource etc. Therefore, there is a risk of generating a resource conflict among modules that are operating simultaneously, thus affecting their normal operation. When activating a data folder module during videophone communications, reading files or generating thumbnails consumes much time for CPU processing when generating a list of files in the data folder, which may cause a delay in videophone processing. This may pose the problems of voice interruption, image disturbance, etc.

SUMMARY OF THE INVENTION

The present invention is made in consideration of the above problems. Accordingly, it is an object of the invention to provide an electronic apparatus in which, even in the case where a list of image files stored in a data folder is displayed to the user while another function is active, the list of image files can be displayed without degradation in the performance of the other function due to a CPU resource conflict.

To solve the above problems, an electronic apparatus according to an aspect of the invention includes a storage unit configured to store a plurality of image files; an acquisition unit configured to acquire a CPU use rate when displaying a list of image files stored in the storage unit; a setting unit configured to set the display format of the list of image files stored in the storage unit on the basis of the CPU use rate acquired by the acquisition unit; and a display unit configured to display the list of image files stored in the storage unit in the display format set by the setting unit.

And to solve the above problems, A list display method of a electronic apparatus according to an aspect of the invention includes a acquiring step of acquiring a CPU use rate when displaying a list of image files stored in the electronic apparatus; a setting step of setting the display format of the list of image files stored in the electronic apparatus on the basis of the CPU use rate acquired at the acquiring step; and a displaying step of displaying the list of image files stored in the electronic apparatus in the display format set at the setting step.

With this electronic apparatus, even in the case where a list of image files stored in a data folder is displayed to the user while another function is active, the list of image files can be displayed without degradation in the performance of the other function due to a CPU resource conflict.

DESCRIPTION OF THE PREFERRED EMBODIMENTS

Figure 1A:
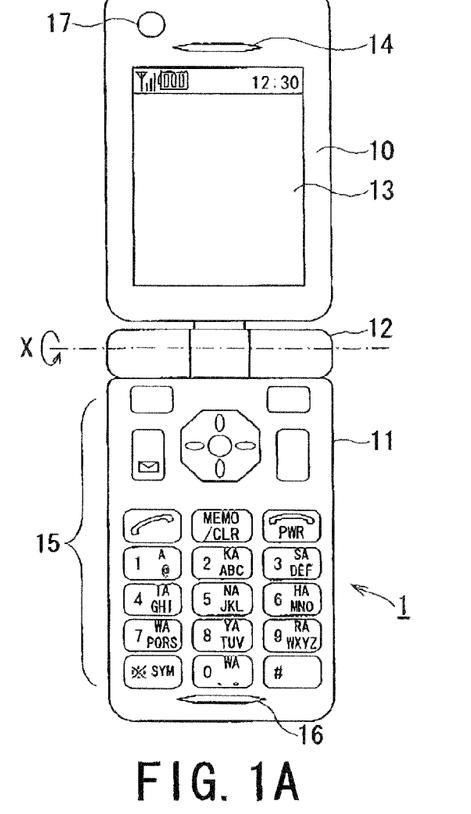
FIG. 1A is a front view showing an electronic apparatus (mobile phone) according to an embodiment of the invention in the open state.
Figure 1B:
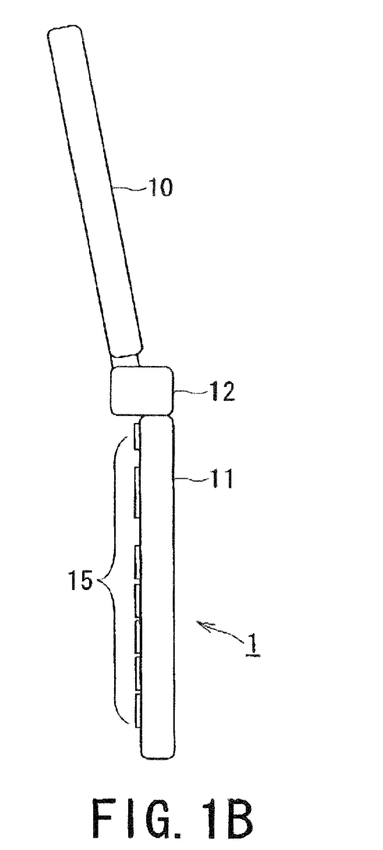
FIG. 1B is a side view of the mobile phone according to the embodiment of the invention in the open state.
Figure 2A:
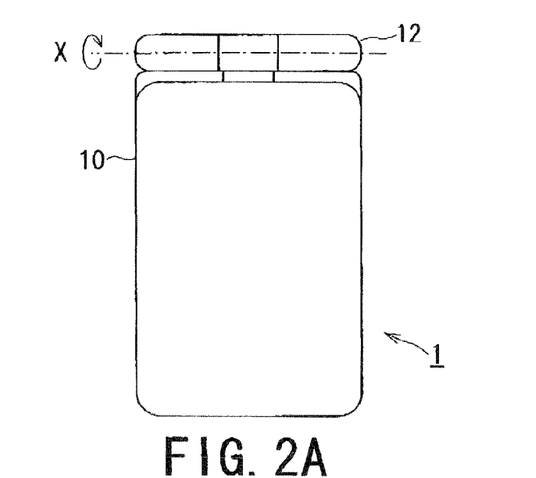
FIG. 2A is a front view of the electronic apparatus (mobile phone) according to the embodiment of the invention in the closed state.
Figure 2B:
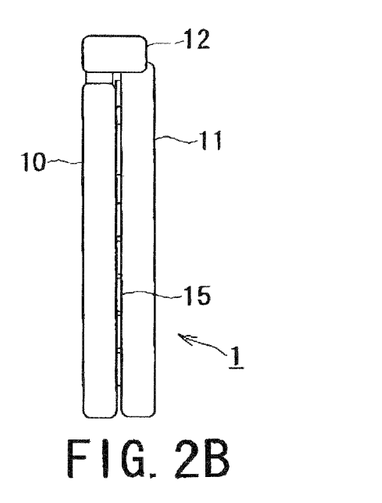
FIG. 2B is a side view of the mobile phone according to the embodiment of the invention in the closed state.

An electronic apparatus and a list display method of an electronic apparatus according to an embodiment of the present invention will be described with reference to the drawings. An example of the electronic apparatus of the invention will be described using a clamshell-type mobile phone 1 whose plurality of casings are openably and closably connected. FIG. 1A is a front view showing the mobile phone 1 according to an embodiment of the invention in the open state; FIG. 1B is a side view of the mobile phone 1 in the open state; FIG. 2A is a front view of the mobile phone 1 in the closed state; and FIG. 2B is a side view of the mobile phone 1 in the closed state.

As shown in FIGS. 1A to 2B, the mobile phone 1 is mainly composed of a rectangular-plate-shaped upper casing 10 and a lower casing 11 having the same shape as the upper casing 10. The upper casing 10 and the lower casing 11 are layered in such a manner as to mutually cover the opposing surfaces in the closed state. The upper casing 10 and the lower casing 11 are joined via a hinge 12, with the hinge 12 therebetween. The upper casing 10 is formed so as to be rotatable by a predetermined angle about the hinge 12 in the X-direction in FIGS. 1A and 2A. The mobile phone 1 changes in form from the closed state to the open state or from the open state to the closed state by rotating the upper casing 10 toward the lower casing 11.

The inner surface of the upper casing 10 (the surface facing the lower casing 11) is provided with a display 13 for displaying display information including characters and images. Examples of the display 13 include a liquid crystal display formed of a liquid crystal panel and an organic EL display formed of an organic EL panel. The inner surface of the upper casing 10 is also provided with a speaker 14 that outputs sound and a camera 17 that photographs surrounding scenery. In a state in which the mobile phone 1 is closed, the display 13, the speaker 14, and the camera 17 are covered with the lower casing 11, so that they are not exposed to the exterior; however, they are exposed to the exterior when the upper casing 10 is rotated toward the lower casing 11 so that the mobile phone 1 is changed in shape into the open state.

The inner surface of the lower casing 11 (the surface facing the upper casing 10) is provided with operation keys 15 including a power key for switching the ON/OFF of a power source, a calling key for performing calling processing, a numeric keypad for inputting figures and characters, and shortcut keys for starting a mail function, a Web browsing function, etc. The inner surface of the lower casing 11 is also provided with a microphone 16 for collecting sound. In a state in which the mobile phone 1 is closed, the operation keys 15 and the microphone 16 are covered with the upper casing 10 and are not exposed to the exterior; however, when the upper casing 10 is rotated toward the lower casing 11 into the open state, they are exposed to the exterior.

Figure 3:
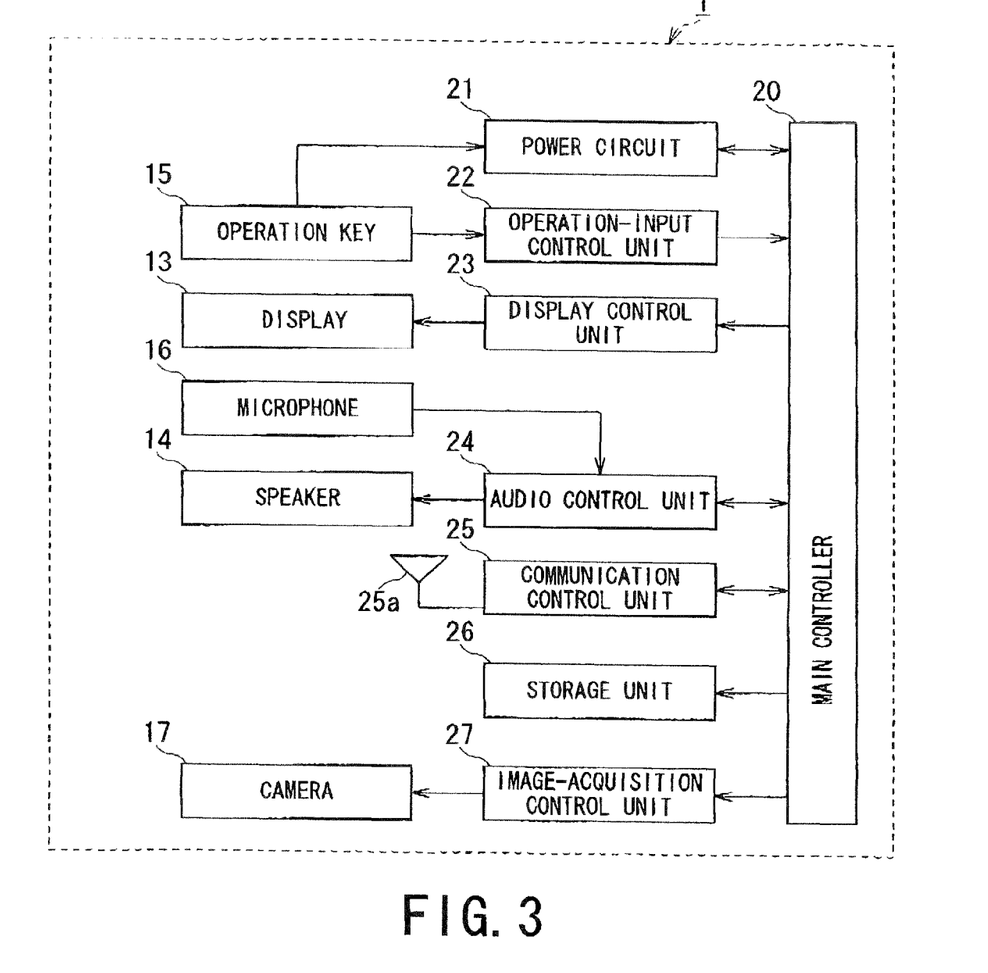
FIG. 3 is a block diagram of the electronic apparatus (mobile phone) according to the embodiment of the invention.

Next, the functions of the mobile phone 1 will be described with reference to a block diagram shown in FIG. 3. As shown in FIG. 3, the mobile phone 1 includes a main controller 20, a power circuit 21, an operation-input control unit 22, a display control unit 23, an audio control unit 24, a communication control unit 25, a storage unit 26, and an image-acquisition control unit 27, which are mutually connected with a bus to allow communications.

The main controller 20 is equipped with a CPU that performs various data processing operations and calculations, which controls over the mobile phone 1 as a whole and performs screen display processing, screen updating processing, to be described later, and other various operations and control processing. The power circuit 21 switches the ON/OFF of the power source according to an user's input through the operation keys 15; when the power source is ON, it supplies power from the power supply source (a battery or the like) to the components to make the mobile phone 1 operable.

The operation-input control unit 22 is equipped with an input interface to the operation keys 15; when one of the operation keys 15 is pressed, it generates a signal indicating the pressed key and transmits it to the main controller 20. The display control unit 23 is equipped with a display interface to the display 13 and displays a screen having document data, still-image data, moving-image data, etc. on the basis of the control of the main controller 20.

The audio control unit 24 generates an analog audio signal from sound collected by the microphone 16 and converts the analog audio signal to a digital audio signal on the basis of the control of the main controller 20. When obtaining the digital audio signal, the audio control unit 24 converts the digital audio signal to an analog audio signal and outputs it as sound from the speaker 14 on the basis of the control of the main controller 20.

The communication control unit 25 restores data in a receiver signal received from a base station via an antenna 25a by spread spectrum inverse processing on the basis of the control of the main controller 20. The data is transmitted to the audio control unit 24 and is output from the speaker 14, is transmitted to the display control unit 23 and is displayed on the display 13, or is stored in the storage unit 26 in accordance with an instruction of the main controller 20. Furthermore, when audio data collected by the microphone 16, data input via the operation keys 15, or data stored in the storage unit 26 is obtained, the communication control unit 25 performs spread spectrum processing on the data and transfers it to the base station via the antenna 25a on the basis of the control of the main controller 20.

The storage unit 26 is constituted of a ROM that stores processing programs, data necessary for processing, etc., a hard disk, a non-volatile memory, a database, a RAM that temporarily stores data that is used when the main controller 20 performs processing, etc. A processing program that is used when the main controller 20 performs display control processing, described below, is stored in the ROM, for example.

The image-acquisition control unit 27 is equipped with a camera interface to the camera 17 and transmits an image signal taken by the camera 17 to the main controller 20. The main controller 20 displays the photographed image on the display 13 via the display control unit 23 in response to the image signal or transmits the photographed image via the communication control unit 25. The image-acquisition control unit 27 also compresses and codes an image signal input from the camera 17 by a predetermined coding system, such as MPEG-4, on the basis of the control of the main controller 20 to create an image file and stores it in the storage unit 26.

The mobile phone 1 has a videophone function that allows the user to perform conversation while viewing the image of a recipient in real time by mutually transmitting an image taken by the camera 17 during conversation. The mobile phone 1 also has the function of transmitting a still image stored in the storage unit 26 in advance to the recipient instead of its own live image taken by the camera 17 during videophone communications. To achieve this function with the mobile phone 1, it is necessary to activate a data folder module to display a file list in a certain format to the user while executing a videophone module to allow the user to select a desired file to be transmitted from the files.

Thus, mobile phones often provide one function by operating a plurality of modules. However, the mobile phone 1 has a limitation in CPU resource, etc. Therefore, there is a risk of generating a resource conflict among modules that are operating simultaneously, thus affecting its normal operation. For example, when activating a data folder module during videophone communications, reading a file or combining thumbnails consumes much time for CPU processing when generating a list of files stored in the data folder, which may cause a delay in videophone processing. This may pose the problems of voice interruption, image disturbance, etc.

Thus, the mobile phone 1 has the function of changing the display format of a list of image files when displaying it in accordance with a CPU use rate at that time. This is because there is a risk of troubles of a function that is being executed, such as a videophone function, due to a CPU resource conflict caused by generating a list of image files, in particular, while executing the function (creating thumbnail images).

Figure 4:
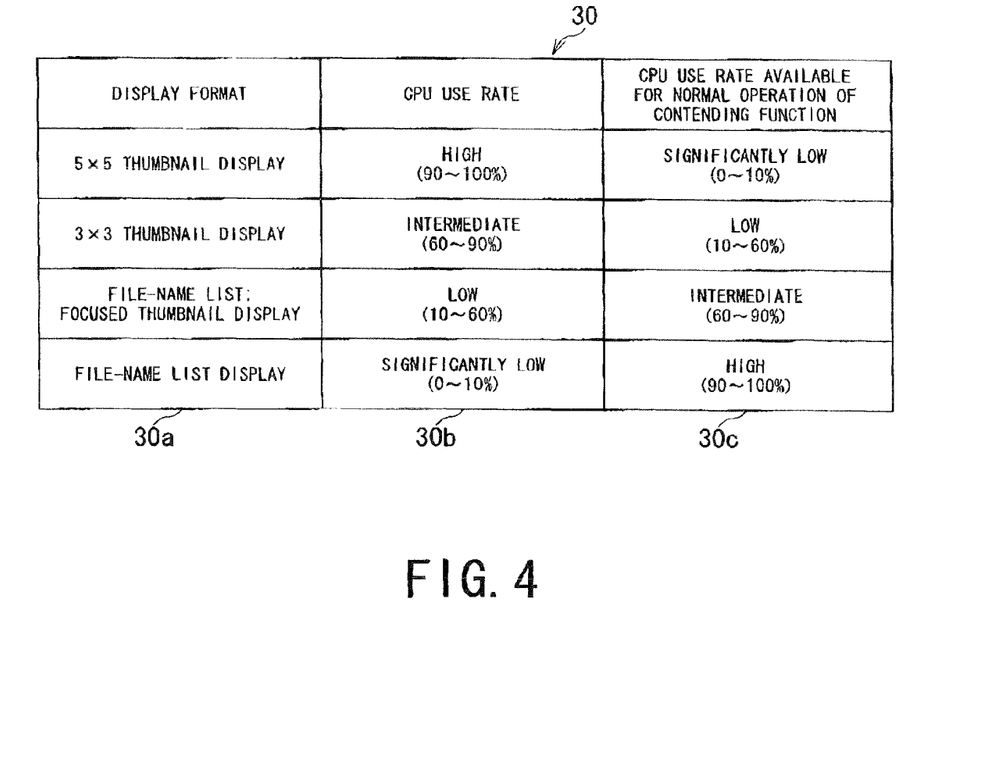
FIG. 4 is a diagram of the data configuration of a CPU use rate table.

FIG. 4 shows a CPU use rate table 30 showing the CPU use rates of individual display formats when the mobile phone 1 displays a list of image files to the user. The CPU use rate table 30 is information of display-format information 30a indicating the display formats of a list of image files, CPU-use-rate information 30b indicating CPU use rates when the list is displayed in the individual display formats, and CPU-use-rate information 30c indicating a CPU use rate available for a contending function, which are associated with each other.

Figure 5A:
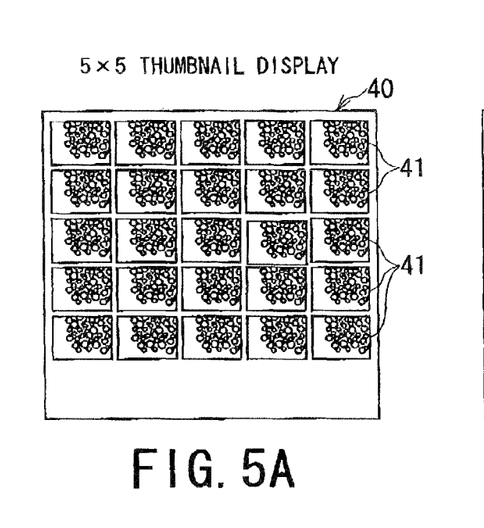
FIG. 5A is a diagram showing the display format of "5×5 thumbnail display"

For example, "5×5 thumbnail display", which is a display format in which 25 image files in total are displayed at the same time in a 5×5 lattice form, has a high CPU use rate and occupies 90% to 100% of the CPU resource. Accordingly, a CPU use rate available for a contending function (a function activated at the same time) to perform normal operation is significantly low, that is, from 0% to 10%. As shown in FIG. 5A, with the display format of "5×5 thumbnail display", it is necessary to generate 25 thumbnail images 41 and display them on a display screen 40 of the display 13, which takes much time for processing.

Figure 5B:
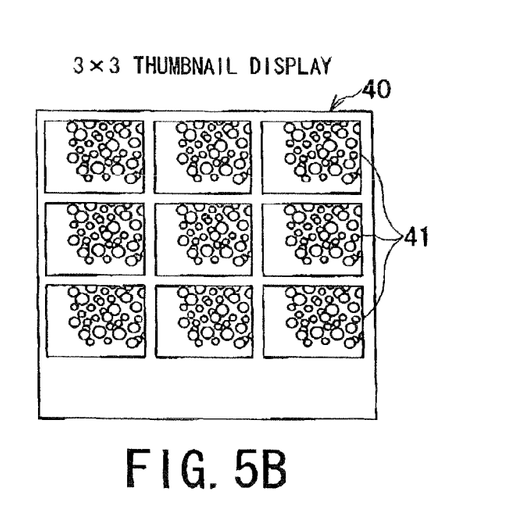
FIG. 5B is a diagram showing the display format of "3×3 thumbnail display"

On the other hand, "3×3 thumbnail display", which is a display format in which nine image files in total are displayed at the same time in a 3×3 lattice form, has an intermediate CPU use rate, that is, from 60% to 90%. Accordingly, a CPU use rate available for a contending function to perform normal operation is low, that is, from 10% to 60%. As shown in FIG. 5B, with the display format of "3×3 thumbnail display", it is necessary to generate nine thumbnail images 41 and display them on the display screen 40 of the display 13.

Figure 5C:
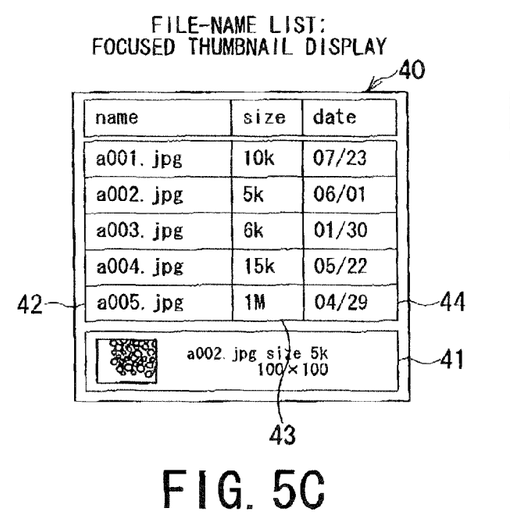
FIG. 5C is a diagram showing the display format of "filename list; focused thumbnail display"

On the other hand, "file-name list; focused thumbnail display", which is a display format in which only a list of file names is displayed and only an image file whose name is focused is displayed in the form of a thumbnail image, has a low CPU use rate, that is, from 10% to 60%. Accordingly, a CPU use rate available for a contending function to perform normal operation is intermediate, that is, from 60% to 90%. As shown in FIG. 5C, with the display format of "file-name list; focused thumbnail display", the names 42, the sizes 43, and the creation dates 44 of the image files are displayed on the display screen 40 of the display 13; and only the thumbnail image 41 of one focused image of the plurality of image files displayed as a list is displayed. Therefore, it takes not so long time for CPU processing.

Figure 5D:
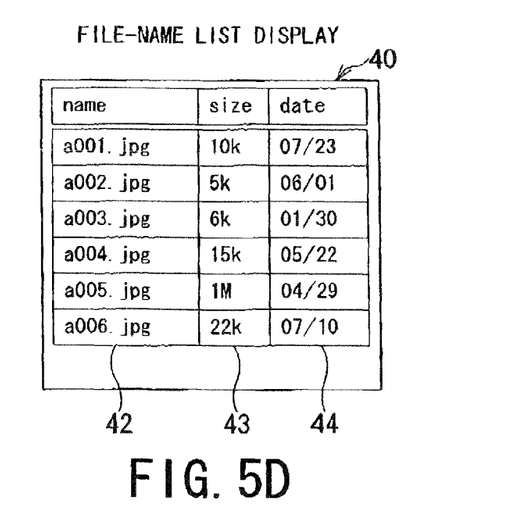
FIG. 5D is a diagram showing the display format of "filename list display"

"File-name list display", which is a display format in which only a list of file names is displayed, has a significantly low CPU use rate, that is, from 0% to 10% Accordingly, a CPU use rate available for a contending function to perform normal operation is high, that is, from 90% to 100%. As shown in FIG. 5D, with the display format of "file-name list display", only the names 42, the sizes 43, and the creation dates 44 of the image files are displayed on the display screen 40 of the display 13, and the thumbnail image 41 is not generated. Therefore, the load on the CPU is significantly low.

When displaying a list of image files in the display format of "5×5 thumbnail display", it is not desirable to simultaneously activate a function having a high CPU use rate, such as the videophone function. Accordingly, if there is a need to display a list of image files while the videophone function is active, the list of image files can be displayed only in the display format of "file-name list display" with a significantly low CPU use rate because more than 90% of the CPU resource is occupied by the videophone function.

On the other hand, in the case where there is a need to display a list of image files while a function having a significantly low CPU use rate, such as a mail browsing function, is active, the apparatus can be normally operated even if the list of image files is displayed in any display format including the display format of "5×5 thumbnail display" because only about 10% of the CPU resource is used for the mail browsing function.

The storage unit 26 stores a plurality of image files and also stores setting information indicating the display formats of data folders that store these image files in advance. The setting information is set by the user in advance or is used when the list of image files is displayed before and indicates a display format, such as "5×5 thumbnail display". Hereinafter, the information designated by the setting information is referred to as "data-folder setting A".

Figure 6:
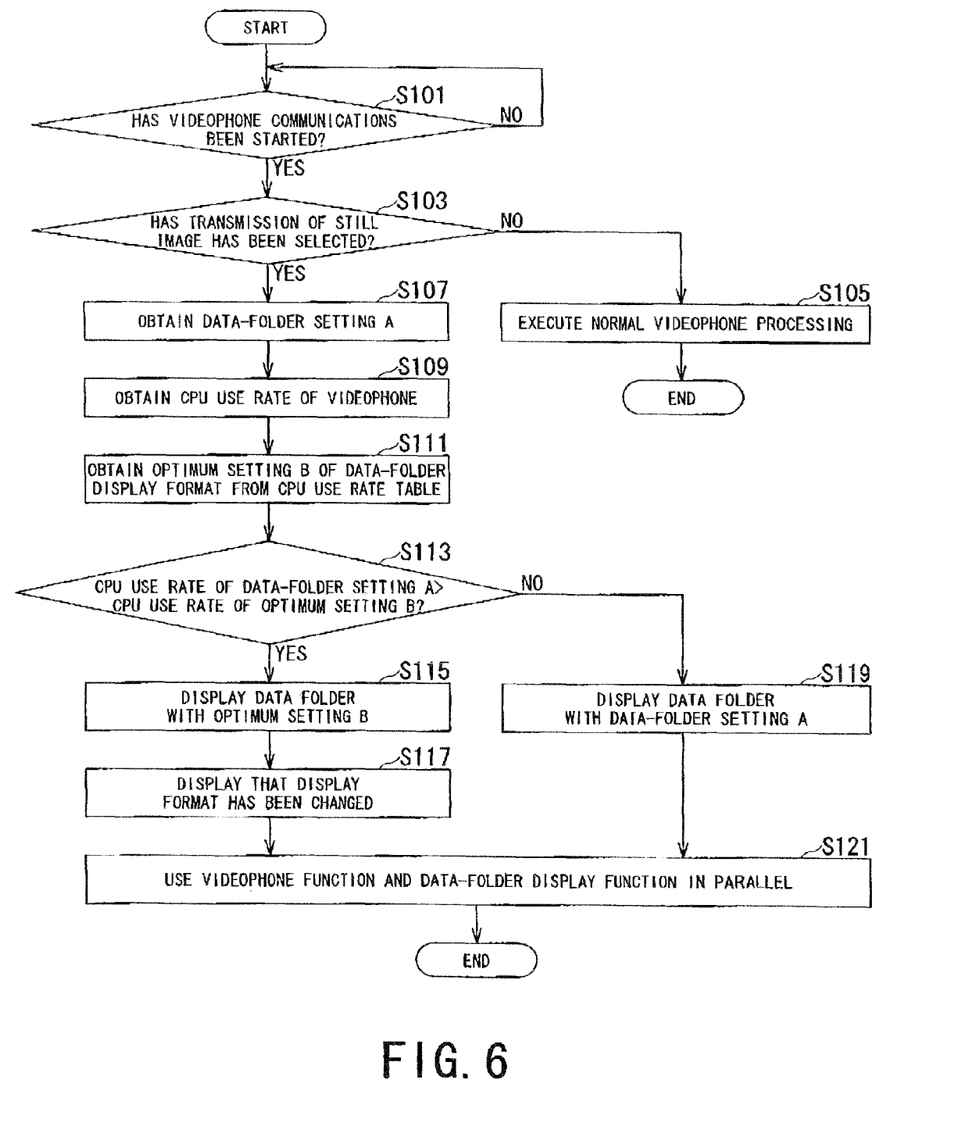
FIG. 6 is a flowchart showing the procedure of display control processing by the electronic apparatus (mobile phone) according to the embodiment of the invention.

A procedure by which the mobile phone 1 executes the process of controlling the display format of a list of image files when there is a need to display it while some of the functions, such as the videophone function, is active will be described with reference to a flowchart shown in FIG. 6. Although this is described as applied to a case in which the videophone function is active, the active function is not limited thereto. Hereinafter, the term "step" will be omitted; for example, "step S101" is referred to as "S101".

First, the main controller 20 determines whether the videophone communications have been started (S101). If the videophone communications have not been started (No in S101), the main controller 20 waits. If the videophone communications have been started (Yes in S101), the main controller 20 determines whether transmission of a still image to a recipient has been selected (S103).

That is, for the videophone communications, an image taken by the camera 17 is transmitted during photographing or a still image designated by the user is transmitted before starting conversation, and the image is displayed on the mobile phone of a recipient who received the image. If the user desires to transmit a still image to the recipient, the user selects a desired still image from a plurality of image files before starting conversation.

If an image that is being photographed is to be transmitted, that is, if still-image transmission is not selected (No in S103), the main controller 20 executes normal videophone processing in which images photographed by the cameras 17 are transmitted to each other (S105). If still-image transmission has been selected (Yes in S103), the main controller 20 obtains the data-folder setting A from the storage unit 26 (S107). The main controller 20 also obtains the CPU use rate of the videophone (S109). The CPU use rate is obtained on the basis of the actual busy condition of the CPU at that time.

The main controller 20 obtains optimum setting B for the data-folder display format from the CPU use rate table 30 stored in the storage unit 26 (S111) For example, according to the CPU use rate table 30 shown in FIG. 4, since the CPU use rate of the videophone function, which is a function that contends with displaying a list of image files, is high (90% to 100%), the display format of "file-name list display" is the optimum display format. Accordingly, in this case, the main controller 20 obtains the display format of "file-name list display" as the optimum setting B.

The main controller 20 determines whether the CPU use rate of the data-folder setting A obtained in step S107 is higher than the CPU use rate of the optimum setting B obtained in step S111 (S113). For example, if the data-folder setting A is set to the display format of "3×3 thumbnail display", the CPU use rate of the display format of "3×3 thumbnail display" (the data-folder setting A) is 60% to 90", and the CPU use rate of the display format of "file-name list display" (the optimum setting B) is 0% to 10% according to the CPU use rate table 30. Accordingly, the main controller 20 determines that the CPU use rate of the data-folder setting A is higher.

If the CPU use rate of the data-folder setting A is higher than the CPU use rate of the optimum setting B (Yes in S113), the contending function cannot be operated normally. Therefore, the main controller 20 displays the list of image files on the display 13 using the display format of the optimum setting B (S115). The main controller 20 then displays on the display 13 that the display format has been changed to notify the user of the change in display format (S117).

If the CPU use rate of the data-folder setting A is not higher than that of the optimum setting B (No in S113), the contending function can be operated normally even if the list of image files is displayed using a display format that is set by the user in advance. Therefore, the main controller 20 displays the list of image files on the display 13 using the data-folder setting A (S119).

After displaying the list of image files in step S115 or S119, the main controller 20 operates both the videophone function and the data-folder display function in parallel (S121). Thus, the user can view the list of image files while performing videophone communications with the mobile phone 1.

Figure 7A:
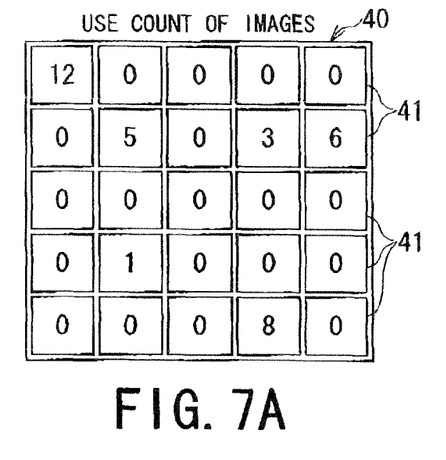
FIG. 7A is a diagram showing the frequency of use of the individual images in the display format of "5×5 thumbnail display"
Figure 7B:
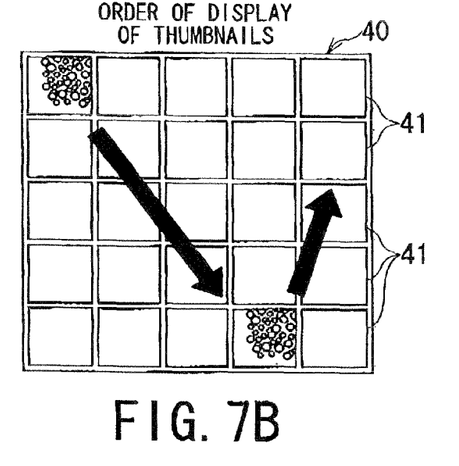
FIG. 7B is a diagram showing the order of display of the images in the display format of "5×5 thumbnail display"

When displaying the list of image files in the form of thumbnail images 41 in step S115 or S119, it is preferable to display the images in decreasing order of the frequency of use. For example, as shown in FIG. 7A, if the 25 thumbnail images displayed in a list on the display screen 40 of the display 13 include an image file that was used 12 times, an image file that was used eight times, an image file that was used six times, etc., they are displayed in decreasing order of the frequency of use, such as in order of the image file that was used 12 times, the image file that was used eight times, etc, one after another, as shown in FIG. 7B. Thus, when displaying the list of image files, an image that the user desires to use (the most frequently used image) is displayed in an early stage, so that the user can select an image displayed early, before all the images are displayed.

Figure 7C:
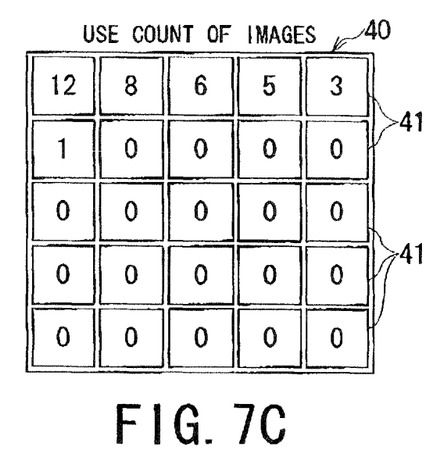
FIG. 7C is a diagram showing the arrangement of the images in the display format of "5×5 thumbnail display"

As an alternative, when displaying the list of image files in the form of thumbnail images 41 in step S115 or S119, the images may be displayed on the display screen, the highest order first, in decreasing order of the frequency of use. For example, if the 25 thumbnail images displayed in a list on the display screen 40 of the display 13 include an image file that was used 12 times, an image file that was used eight times, an image file that was used six times, etc., as shown in FIG. 7A, they are displayed, the highest order first, in decreasing order of the frequency of use, such as in order of the most frequently used image file (the image file that was used 12 times), the second most frequently used image file (the image file that was used eight times), etc, as shown in FIG. 7C. Thus, when displaying the list of image files, an image that the user desires to use (the most frequently used image) is displayed first on the display screen of the display 13, so that the user can select the image with a minimum key operation.

As a further alternative, when displaying the list of image files in the form of thumbnail images 41 in step S115 or S119, only frequently used image files or recently used image files may be displayed. In this case, the thumbnail images of the other image files may be displayed in accordance with a user's instruction using the operation keys 15.

When displaying the list of image files, it is preferable that the mobile phone 1 display the most frequently used image file or the last used image file with a cursor placed on it. Thus, when the user desires to select an image file that is usually used frequently, the user can select the image file with a minimum key operation.

In this way, when displaying a list of image files, the mobile phone 1 prevents interference with the normal operation of another active function due to the displaying of the list of image files by switching the display format of the list of image files in accordance with the use condition of the CPU resource by the other function.

Although the embodiment has been described as applied to videophone communications, the invention is not limited thereto; the process of step S105 or S107 can be applied to a case in which any function is activated. In particular, this is useful for a case in which processing with a high use rate, such as watching television, recording a television program, recording with a camera, playing back a moving image, or streaming, is activated, because there is a risk of interrupting the moving image or sound due to the process of generating a thumbnail image.

Furthermore, when the display format is changed in step S113, the display format becomes different from the display format that the user himself/herself sets. Thus, the mobile phone 1 notifies the user of the change, thereby preventing the user from feeling uncomfortable.

Furthermore, in the case of generating thumbnail images when displaying a list of image files, the mobile phone 1 displays an image file that is frequently used in the videophone function (or may include another function) with high priority or by restriction This allows the user to select a frequently used image file in an early stage while the thumbnail images are displayed.

Here, the mobile phone 1 performs thumbnail-image generating processing for generating and storing the thumbnail images of an image file stored in the storage unit 26 one by one while the mobile phone 1 is in the idle state in which the CPU use rate is low (reception waiting state) to prevent the process of displaying the thumbnail images from taking much time. The procedure for the thumbnail generating processing of the mobile phone 1 will be described with reference to a flowchart in FIG. 8.

Figure 8:
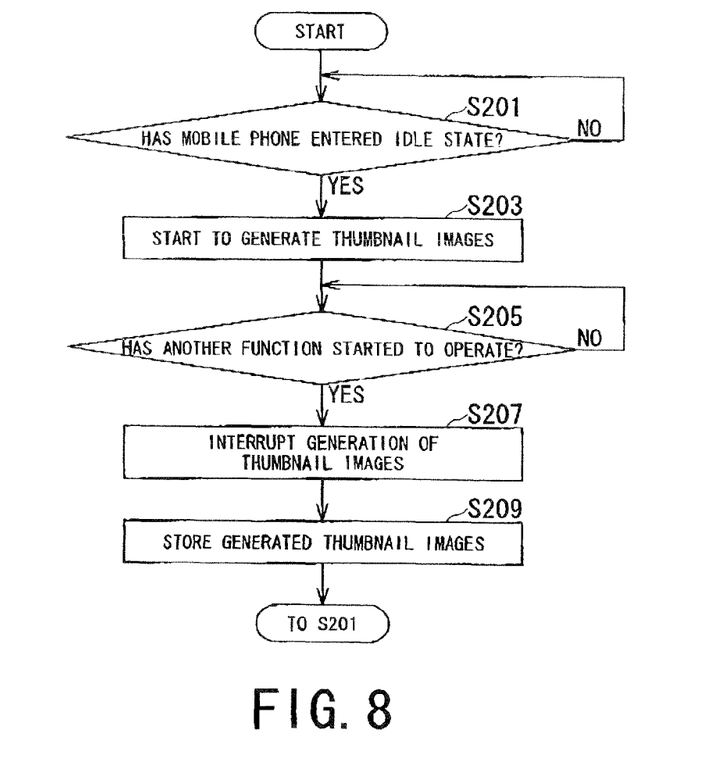
FIG. 8 is a flowchart showing the procedure of thumbnail generation processing by the electronic apparatus (mobile phone) according to the embodiment of the invention.

First, the main controller 20 determines whether the mobile phone 1 has entered the idle state (S201). If the mobile phone 1 has not entered the idle state (No in S201), the main controller 20 waits. If the mobile phone 1 has entered the idle state (Yes in S201), the main controller 20 starts to generate the thumbnail images (S203). At that time, if there is a thumbnail image whose generation is interrupted by the process in step S207, described later, the generation of the thumbnail image is started again.

For example, while another function is activated as the user operates the operation keys 15, it is desirable that the thumbnail-image generating process be interrupted so as not to interfere with the normal operation of the other function. Thus, the main controller 20 determines whether the other function has started to operate (S205). If the other function has not started to operate (No in S205), the process returns to step S205, where the main controller 20 monitors whether another function is active while continuing the generation of thumbnail images.

If another function starts to operate (Yes in S205), the main controller 20 interrupts the generation of thumbnail images that is started in step S203 to prevent the thumbnail-image generating process from contending with the function that has started to operate (S207). The main controller 20 then stores the generated thumbnail images in the storage unit 26 (S209).

In this way, the mobile phone 1 reduces the processing time for displaying thumbnail images by generating thumbnail image at the back in advance. The image file for generating thumbnail images may be all the images, only frequently used images, the last created image file, or only the last used image file. After the thumbnail images of such image file have been generated by priority, the thumbnail images of the remaining image files may be generated one by one.

As an alternative, the thumbnail image of only the last photographed image file, an image file that is obtained last via a network, or an image file that is used last for videophone communications may be generated at the back in advance when the mobile phone 1 is in the idle state. In this case, if the idle state continues, the thumbnail images of the remaining image files may be generated.

Figure 9:
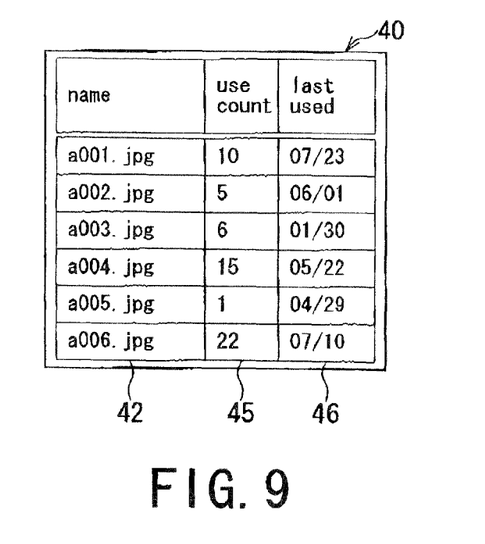
FIG. 9 is a diagram showing an example of a display screen for display control processing by the electronic apparatus (mobile phone) according to the embodiment of the invention.

Although the embodiment has been described as applied to an example in which when displaying a list of image files in the display format of "file-name list display", the names 42, the sizes 43, and the creation dates 44 of the image files are displayed, as shown in FIG. 5D, the invention is not limited thereto; the names 42, the use counts 45, and the last dates used 46 of the image files may be displayed as shown in FIG. 9.

With the electronic apparatus (mobile phone 1) according to an embodiment of the invention, even in the case where a list of image files stored in a data folder is displayed to the user while another function is active, the list of image files can be displayed without degradation in the performance of the other function due to a CPU resource conflict by changing the display format in accordance with the CPU use rate. Furthermore, when creating document data with the mobile phone 1, the user can easily select frequently used image data by displaying thumbnail images based on history information, allowing the user to smoothly create the document data.

Although the mobile phone 1 has been described as an embodiment of the inventions the invention is not limited thereto; any electronic apparatus that has the function of displaying a list of image files, such as a PHS, a PDA, a compact television, a digital camera, a video camera, portable audio equipment, and portable video equipment, is possible.

What is claimed is:

1. An electronic apparatus comprising:
   a storage unit which stores a plurality of image files, a CPU use rate table, and a predetermined display format for the plurality of image files; and
   a processor, the processor comprising:
      an acquisition unit configured to acquire a CPU use rate of a function of the electronic apparatus when the function is to be executed concurrently with displaying of a list of the plurality of image files stored in the storage unit, and to acquire an optimum display format based on the CPU use rate table and the CPU use rate of the function;
      a setting unit configured to set a display format of the list of the plurality of image files stored in the storage unit based on a result of comparison of a CPU use rate of the predetermined display format with a CPU use rate of the optimum display format acquired by the acquisition unit; and
      a display unit configured to display the list of the plurality of image files stored in the storage unit in the display format set by the setting unit.

2. The electronic apparatus according to claim 1, wherein when displaying the list of the plurality of image files stored in the storage unit using thumbnail images, the display unit generates and displays the thumbnail images in decreasing order of a frequency of use.

3. The electronic apparatus according to claim 1, wherein when displaying the list of the plurality of image files stored in the storage unit using thumbnail images, the display unit generates and displays the thumbnail images in reverse chronological order of use.

4. The electronic apparatus according to claim 1, comprising a generating unit configured to generate the thumbnail images of the plurality of image files stored in the storage unit while the electronic apparatus is idle.

5. The electronic apparatus according to claim 1, wherein display formats that can be set by the setting unit include a display format that uses a thumbnail image.

6. The electronic apparatus according to claim 1, wherein when displaying the list of the plurality of image files stored in the storage unit, the display unit displays the most frequently used image file with a cursor placed on it.

7. The electronic apparatus according to claim 1, wherein when displaying the list of the plurality of image files stored in the storage unit, the display unit displays the last used image file with a cursor placed on it.

8. A list display method of an electronic apparatus comprising:
   an acquiring step of acquiring a CPU use rate of a function of the electronic apparatus when the function is to be executed concurrently with displaying of a list of image files stored in the electronic apparatus, and to acquire an optimum display format based on a CPU use rate table and a CPU use rate of the function;
   a setting step of setting a display format of the list of image files stored in the electronic apparatus based on a result of comparison of a CPU use rate of the predetermined display format with a CPU use rate of the optimum display format acquired at the acquiring step; and
   a displaying step of displaying the list of image files stored in the electronic apparatus in the display format set at the setting step.

9. The list display method of the electronic apparatus according to claim 8, wherein when displaying the list of image files stored in the electronic apparatus using thumbnail images, the thumbnail images are generated and displayed in decreasing order of the frequency of use at the displaying step.

10. The list display method of the electronic apparatus according to claim 8, wherein when displaying the list of image files stored in the electronic apparatus using thumbnail images, the thumbnail images are generated and displayed in reverse chronological order of use at the displaying step.

11. The list display method of the electronic apparatus according to claim 8, comprising a generating step of generating the thumbnail images of the image file stored in the electronic apparatus while the electronic apparatus is idle.

12. The list display method of the electronic apparatus according to claim 8, wherein display formats that can be set at the setting step include a display format that uses a thumbnail image.

13. The list display method of the electronic apparatus according to claim 8, wherein when displaying the list of image files stored in the electronic apparatus, the most frequently used image file is displayed with a cursor placed on it at the displaying step.

14. The list display method of the electronic apparatus according to claim 8, wherein when displaying the list of image files stored in the electronic apparatus, the last used image file is displayed with a cursor placed on it at the displaying step.

\* \* \* \* \*